(12) United States Patent
Han et al.

(10) Patent No.: US 9,358,907 B2
(45) Date of Patent: Jun. 7, 2016

(54) APPARATUS FOR BACK-FOLDING STANDUP SEAT OF VEHICLE

(71) Applicants: Hyundai Motor Company, Seoul (KR); Kia Motors Corporation, Seoul (KR)

(72) Inventors: Kug Hun Han, Seoul (KR); Young Bok Sung, Hwaseong-si (KR); Sang Ho Kim, Incheon (KR); Soo Hyun Moon, Hwaseong-si (KR); Deok Soo Lim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/570,516

(22) Filed: Dec. 15, 2014

(65) Prior Publication Data

US 2015/0291066 A1 Oct. 15, 2015

(30) Foreign Application Priority Data

Apr. 9, 2014 (KR) .................. 10-2014-0042146

(51) Int. Cl.
*B60N 2/30* (2006.01)
*B60N 2/48* (2006.01)
*B60N 2/12* (2006.01)

(52) U.S. Cl.
CPC ............ *B60N 2/3031* (2013.01); *B60N 2/12* (2013.01); *B60N 2/305* (2013.01); *B60N 2/3011* (2013.01); *B60N 2/4855* (2013.01)

(58) Field of Classification Search
CPC .... B60N 2/3031; B60N 2/305; B60N 2/3011; B60N 2/4855; B60N 2/12
USPC ............................................ 297/61, 336, 331
See application file for complete search history.

(56) References Cited

U.S. PATENT DOCUMENTS

| 4,484,776 | A | * | 11/1984 | Gokimoto | ............... | B60N 2/10 |
| | | | | | | 297/378.13 X |
| 4,627,656 | A | * | 12/1986 | Gokimoto | ............... | B60N 2/10 |
| | | | | | | 297/336 X |
| 4,636,003 | A | * | 1/1987 | Siebler | ................. | B60N 2/3011 |
| | | | | | | 297/336 X |
| 5,145,233 | A | * | 9/1992 | Nagashima | ............ | B60N 2/487 |
| | | | | | | 297/408 X |
| 5,238,285 | A | * | 8/1993 | Holdampf | ............ | B60N 2/01583 |
| | | | | | | 297/336 X |
| 5,393,116 | A | * | 2/1995 | Bolsworth | ......... | B60N 2/01583 |
| | | | | | | 297/378.12 X |
| 5,498,051 | A | * | 3/1996 | Sponsler | ............ | B60N 2/01583 |
| | | | | | | 297/336 X |

(Continued)

FOREIGN PATENT DOCUMENTS

KR 10-2008-0017062 A 2/2008
KR 10-2009-0026257 A 3/2009

(Continued)

*Primary Examiner* — Rodney B White
(74) *Attorney, Agent, or Firm* — Morgan, Lewis & Bockius LLP

(57) ABSTRACT

An apparatus for back-folding a standup seat of a vehicle may include a standup associated back-folding unit that is installed between a hook mounted to a lower frame of a seat cushion to be locked to or unlocked from a striker of a floor panel, and a recliner mounted to a side frame of a seatback such that a forward folding operation of the seatback and a forward folding operation of a headrest that is automatically performed by operating the recliner during a standup operation.

7 Claims, 9 Drawing Sheets

(56) References Cited

U.S. PATENT DOCUMENTS

| | | | | |
|---|---|---|---|---|
| 5,593,208 A * | 1/1997 | Mitschelen | B60N 2/01583 | 297/336 X |
| 5,626,391 A * | 5/1997 | Miller | B60N 2/01583 | 297/331 X |
| 5,634,686 A * | 6/1997 | Okazaki | B60N 2/01583 | 297/336 X |
| 5,662,368 A * | 9/1997 | Ito | B60N 2/01583 | 297/336 X |
| 5,765,894 A * | 6/1998 | Okazaki | B60N 2/01583 | 297/336 X |
| 5,941,591 A * | 8/1999 | Tsuge | B60N 2/206 | 296/65.09 |
| 6,000,742 A * | 12/1999 | Schaefer | B60N 2/3011 | 297/336 X |
| 6,024,411 A * | 2/2000 | Pesta | B60N 2/01583 | 296/65.01 |
| 6,135,555 A * | 10/2000 | Liu | B60N 2/01583 | 297/336 |
| 6,174,017 B1 * | 1/2001 | Salani | B60N 2/01583 | 297/331 X |
| 6,196,610 B1 * | 3/2001 | Pesta | B60N 2/01583 | 296/65.01 |
| 6,361,098 B1 * | 3/2002 | Pesta | B60N 2/01583 | 297/331 X |
| 6,520,581 B1 * | 2/2003 | Tame | B60N 2/206 | 297/336 X |
| 6,523,899 B1 * | 2/2003 | Tame | B60N 2/206 | 297/336 X |
| 6,578,919 B2 * | 6/2003 | Seibold | B60N 2/045 | 297/331 X |
| 6,595,588 B2 * | 7/2003 | Ellerich | B60N 2/01583 | 297/336 X |
| 6,655,738 B2 * | 12/2003 | Kammerer | B60N 2/0292 | 297/336 X |
| 6,676,216 B1 * | 1/2004 | Freijy | B60N 2/3013 | 297/335 X |
| 6,793,285 B1 * | 9/2004 | Tame | B60N 2/3011 | 297/336 X |
| 6,860,564 B2 * | 3/2005 | Reed | B60N 2/20 | 297/61 X |
| 6,991,293 B2 * | 1/2006 | Lang | B60N 2/36 | 297/336 X |
| 7,152,925 B2 * | 12/2006 | Hur | B60N 2/01583 | 297/336 X |
| 7,201,437 B2 * | 4/2007 | Freijy | B60N 2/3011 | 297/336 X |
| 7,854,462 B2 * | 12/2010 | Scholl | B60N 2/3011 | 296/65.05 |
| 8,016,354 B2 * | 9/2011 | Veluswamy | B60N 2/01583 | 297/61 X |
| 8,408,648 B2 * | 4/2013 | Champ | B60N 2/01583 | 297/336 X |
| 8,662,578 B2 * | 3/2014 | Szybisty | B60N 2/20 | 297/61 X |
| 9,145,078 B2 * | 9/2015 | Locke | B60N 2/4829 | |
| 2004/0251705 A1 * | 12/2004 | Tame | B60N 2/206 | 296/65.09 |
| 2007/0132266 A1 | 6/2007 | Ghergheli et al. | | |
| 2009/0058149 A1 * | 3/2009 | Lindsay | B60N 2/0252 | 297/61 |
| 2009/0230744 A1 * | 9/2009 | Szybisty | B60N 2/3011 | 297/335 |
| 2011/0163574 A1 * | 7/2011 | Tame | B60N 2/4852 | 297/61 |
| 2011/0221239 A1 * | 9/2011 | Holdampf | B60N 2/2356 | 297/61 |

FOREIGN PATENT DOCUMENTS

| | | |
|---|---|---|
| KR | 10-2009-0099565 A | 9/2009 |
| KR | 10-2010-0115746 A | 10/2010 |
| KR | 10-2013-0063909 A | 6/2013 |
| KR | 10-2013-0066406 A | 6/2013 |

* cited by examiner

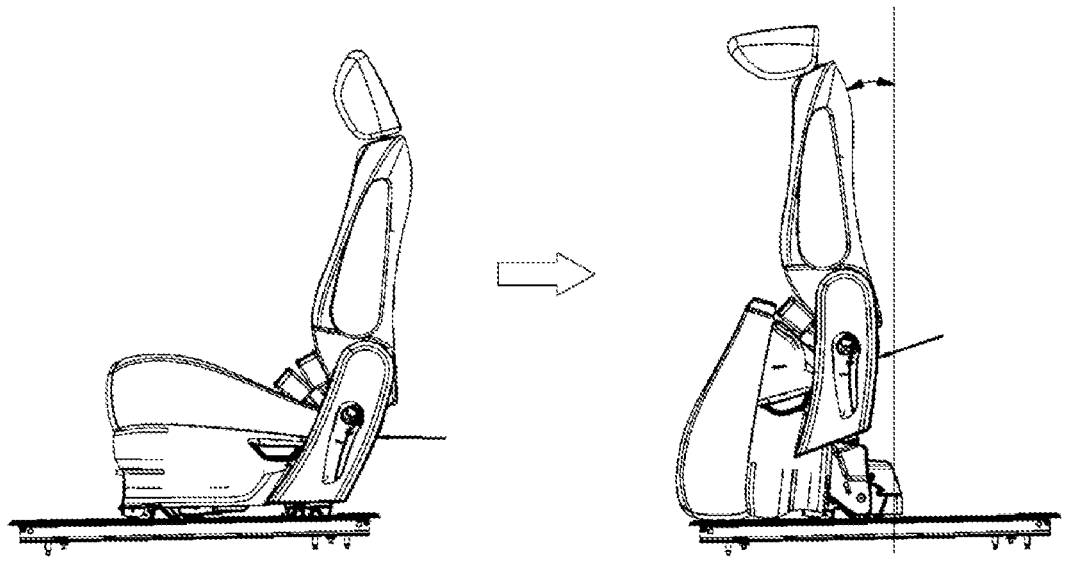
FIG. 2A (Related Art)
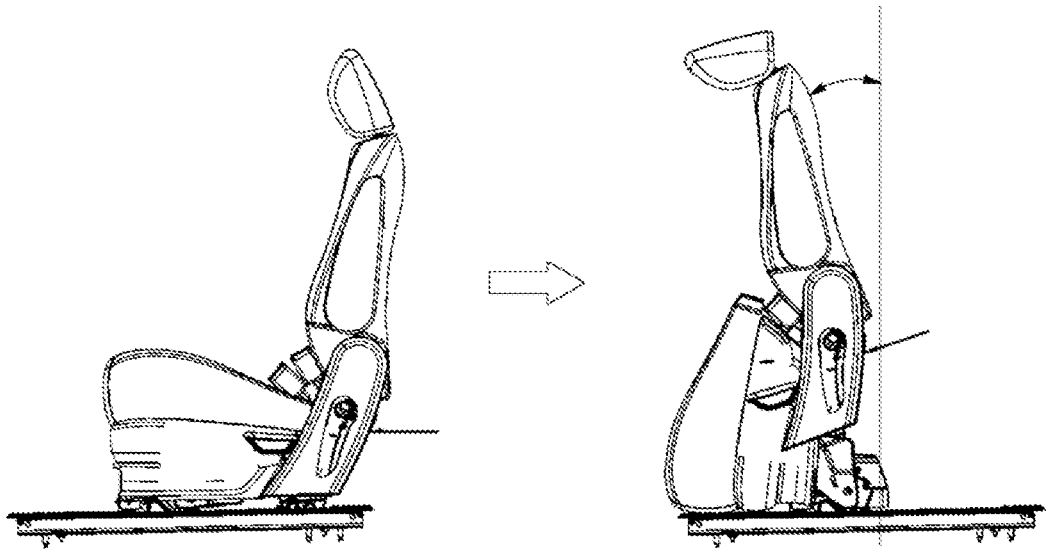
FIG. 2B (Present Invention)

APPARATUS FOR BACK-FOLDING STANDUP SEAT OF VEHICLE

CROSS-REFERENCE TO RELATED APPLICATION

The present application claims priority to Korean Patent Application No. 10-2014-0042146 filed Apr. 9, 2014, the entire contents of which is incorporated herein for all purposes by this reference.

BACKGROUND OF THE INVENTION

1. Field of the Invention

The present invention relates to an apparatus for back-folding a standup seat for a vehicle, and more particularly to an apparatus for back-folding a standup seat for a vehicle through which conveniences of a passenger who desired to be seated on a three-row seat of the vehicle can be improved by widening an upper body entry/exit passage of the passenger.

2. Description of Related Art

In recent years, as interests in vehicles suitable for leisure activities have increased, SUVs, MPVs, and RVs have been spotlighted, and the vehicles employ three-row seats in addition to two-row seats such that family members and several persons can get on the vehicles.

In a vehicle employing a three-row seat, the first row and second row seats may be used while a front door and a rear door are opened, but in most cases, an entry/exit passage for getting on or off should be ensured by moving the second row seat so that the third row seat can be used.

Technologies for securing an entry/exit passage for getting on or off the three-row seat employ a double folding type in which a seatback and a seat cushion are bent forwards while the seatback is folded to the seat cushion, a cushion tilt-up sliding type in which a seatback and a seat cushion are slid forwards while a front end of the seat cushion is angularly rotated to be inclined upwards, and a walk-in sliding type in which a seat cushion is slid forwards while a seatback is reclined to be inclined forwards.

In the walk-in sliding type, an entry/exit passage for getting on or off a three-row seat is determined by a distance between the second row seat and a rear door (opened state), and the distance may be classified into a distance (a of FIG. 1) between a rear end of a seat cushion through which an ankle of a passenger passes and a rear door, a distance (b of FIG. 1) between a lower end of a rear surface of the seatback through which a thigh of a passenger passes and a rear door, and a distance (c of FIG. 1) between an upper end of the rear surface of the seatback through which an upper body and a pelvis of a passenger passes and a rear door.

However, in the walk-in sliding type, as a front sliding length of the seat cushion is restricted, an entry/exit passage of the passenger becomes narrower and inconveniences are caused when the passenger enters.

In order to solve the inconveniences, because the seat cushion is erected forwards and the seatback is moved forwards to be vertically erected as can be seen from FIG. 2A, a standup seat in which a wide entry/exit passage of a passenger can be secured and conveniences can be achieved is employed.

However, as a forward folding operation of the seatback by a reclining apparatus is not performed when the seat cushion is erected forwards in spite of the conveniences of the standup seat, a distance between an upper end of the seatback through which the upper body (particularly, a shoulder) of a passenger passes and the rear door is narrow, so that the shoulder of the passenger contacts the seatback when the passenger gets on or off.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for back-folding a standup seat of a vehicle, in which because during a standup operation of erecting a seat cushion of a two-row seat forwards and moving a seatback forwards and vertically erecting the seatback at the same time while a passenger gets on or off a three-row seat, a forward folding operation of inclining the seatback at a predetermined angle by a reclining apparatus is automatically performed, a passenger entry/exit passage between the seatback and a rear door can be widely secured and accordingly an inconvenience by which a shoulder of the passage contacts the seatback and a periphery of the seatback can be solved.

In accordance with an aspect of the present invention, there is provided an apparatus for back-folding a standup seat of a vehicle, wherein a standup associated back-folding unit is installed between a hook mounted to a lower frame of a seat cushion to be locked to or unlocked from a striker of a floor panel, and a recliner mounted to a side frame of a seatback such that a forward folding operation of the seatback and a forward folding operation of a headrest can be automatically performed by operating the recliner during a standup operation.

The standup associated back-folding unit may include, a standup operation input mechanism connected to a standup operation lever in association with the standup operation lever to unlock the hook from a striker, a standup operation output mechanism connected to the lower frame of the seat cushion to vertically erect the seat cushion while the hook is unlocked and erect the seatback while proceeding the seatback forwards at the same time, and a back-folding mechanism connected between the lower frame of the seat cushion and the recliner of the seatback and the recliner of the headrest to operate the recliner of the seatback during a standup operation such that a forward folding operation of the seatback and a forward folding operation of the headrest are performed at the same time.

The standup operation input mechanism may include, a first input link coaxially connected to the standup operation lever and mounted to an outer surface of the side frame of the seatback, a second input link disposed below the first input link and rotatably connected to the first input link by a first cable, a third input link hinge-mounted to an inner surface of the side frame while being connected to the second input link in association with the second input link to be rotated at the same angle while the second input link is angularly rotated, a fourth input link an upper end of which is coaxially connected to the third input link, and in which one end of a second cable is connected to a lower end of the fourth input link, a fifth input link to which a lower end of a hook support plate mounted to a lower end of the lower frame of the seat cushion is hinge-mounted and in which an opposite end of the second cable is connected to an upper end of the fifth input link at the same time, and a cam connected to a central portion of the fifth input link, for rotating the hook to an unlock position while being rotated at the same angle as that of the fifth input link when the second cable 218 is pulled.

A connection member coaxially connected to the second input link may be formed at an upper end of the third input link, a hinge pin hinge-mounted to an inner surface of the side frame may be mounted to a central portion of the third input link, and a push end for angularly rotating the fourth input link may be bent at a lower end of the third input link.

The standup operation output mechanism may include, a connection frame of which a rear end is hinge-connected to a lower frame of the seat cushion and of which a front end is hinge-connected to a front frame of the seat cushion fixed to a floor panel, and a resilient pulling mechanism connected between the connection frame and the front frame, for pulling the connection frame by a resilient restoring force to unlock the hook and perform a standup operation.

The back-folding mechanism may include, a first back-folding link of which a front end is hinge-connected to a rear end of the connection frame of the standup operation output mechanism and of which a central portion is hinge-coupled to the lower frame, a second back-folding link in which a front end of the second back-folding link is coaxially connected to the hinge coupling part of the first back-folding link, a lower portion of the rear end of the second back-folding link is connected to a rear end of the first back-folding link by a hinge pin, and a third cable for a seatback folding operation and a fourth cable for a headrest folding operation are connected to an upper portion of the rear end of the second back-folding link to be pulled, a recliner operation link connected to an upper end of the third cable, for unlocking the recliner and allowing a forward folding operation of the seatback, and a headrest operation link connected to an upper end of the fourth cable, for unlocking a heat rest rotation link and allowing a forward folding operation of the headrest.

The recliner operation link may include, a third back-folding link in which an upper end of the third cable is connected to a rear end of the third back-folding link and of which a central portion is hinge-coupled to a side frame of the seatback, a recliner unlocking link connected to an unlocking shaft of the recliner, for angularly rotating the recliner to an unlocking position, and a fourth back-folding link of which a lower end is connected between a rear end and a central portion of the third back-folding link and of which an upper end is hinge-connected to the recliner unlocking link.

A rotation angle restriction guide pin may be mounted to a front end of the third back-folding link, and a slot into which the guide pin is inserted may pass through the side frame of the seatback.

The present invention has the following effect.

According to an exemplary embodiment of the present invention, because during a standup operation of erecting a seat cushion of a two-row seat forwards and moving a seatback forwards and vertically erecting the seatback at the same time while a passenger gets on or off a three-row seat, a forward folding operation of inclining the seatback at a predetermined angle by a reclining apparatus is automatically performed, a passenger entry/exit passage between the seat back and a rear door can be widely secured and accordingly an inconvenience by which a shoulder of the passage contacts the seatback and a periphery of the seatback can be solved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 2A and 2B show side views for comparing operation loci of an existing standup seat having no seatback folder and a standup seat having a seatback folder according to an exemplary embodiment of the present invention.

Figure 1:
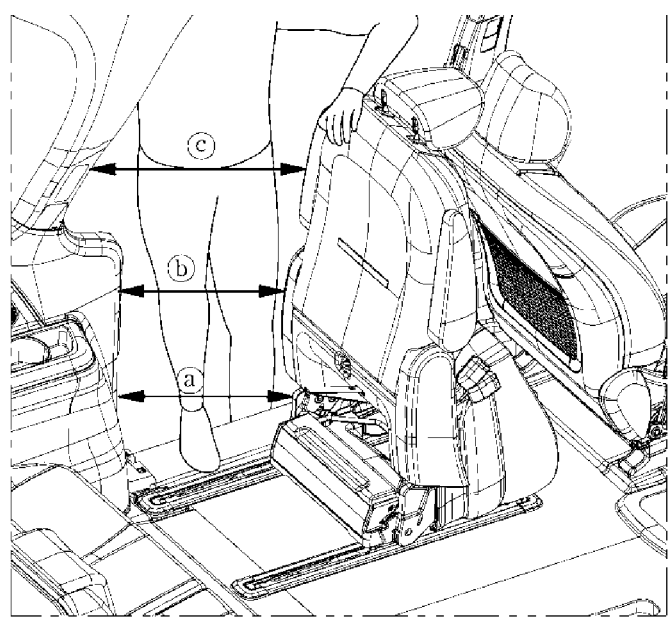
FIG. 1 is a schematic view showing a walk-in slide method corresponding to an entry/exit passage securing technology for getting on/off a three-row seat according to the related art.
Figure 3:
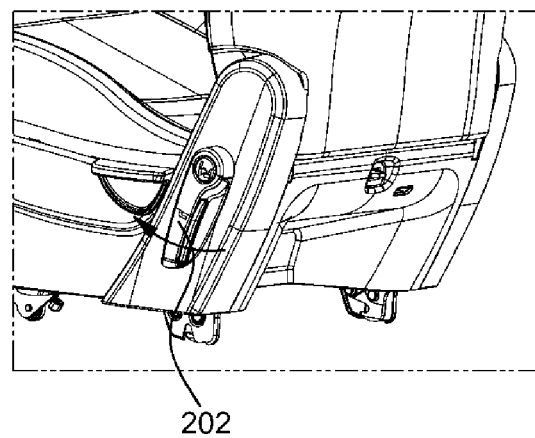
FIG. 3, FIG. 4, FIG. 5, and FIG. 6 are perspective views showing a standup operation input mechanism and an operational structure of an apparatus for back-folding a standup seat of a vehicle according to an exemplary embodiment of the present invention.
Figure 4:
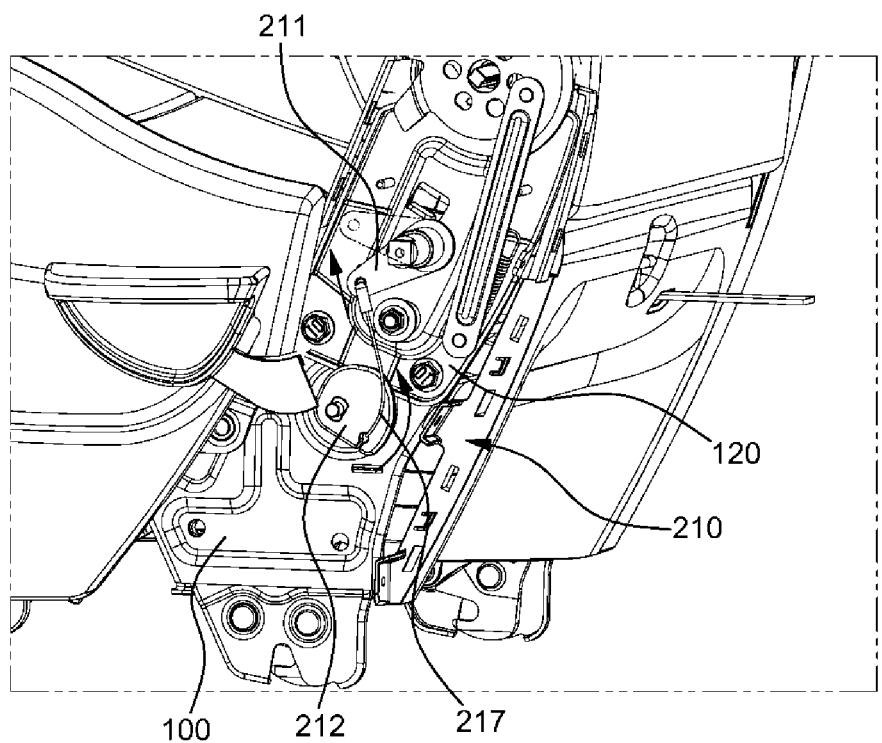

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

The present invention relates to a standup seat for a vehicle and an apparatus for folding a seatback, and the main point of the present invention is that because during a standup operation of erecting a seat cushion of a two-row seat forwards and moving a seatback forwards and vertically erecting the seatback at the same time while a passenger gets on or off a three-row seat, a forward folding operation of inclining the seatback at a predetermined angle by a reclining apparatus is automatically performed, a passenger entry/exit passage between the seatback and a rear door can be widely secured.

In more detail, the standup seat according to the related art forms a path along which a seat cushion is erected forwards and a seatback is moved forwards to be vertically erected as can be seen in FIG. 2A, while the standup seat according to an exemplary embodiment of the present invention forms a path along which a seat cushion is erected forwards and a seatback is moved forwards such that a forward folding operation of a predetermined angle is performed at the same time as can be seen in FIG. 2B, so that a passenger passage between the seatback and the rear door can be secured more widely and accordingly an inconvenience by which a shoulder of the passage contacts the seatback and a periphery of the seatback can be solved.

Here, a configuration and an operational flow of an apparatus for folding a standup seatback, that is, a standup seat and an apparatus for folding a seat according to an exemplary embodiment of the present invention will be described with reference to FIGS. 3 to 11.

The technical feature of the apparatus for folding a standup seatback according to an exemplary embodiment of the present invention is that a standup associated back-folding unit is installed between a hook 110 mounted to a lower frame 100 of a seat cushion to be locked to or unlocked from a striker (not shown) of a floor panel, and a recliner 130 mounted to a side frame 120 of a seatback, so that the recliner 130 of the seatback can be unlocked by the standup associated back-folding unit during a standup operation such that a forward folding operation of the seatback and a forward folding operation of a headrest can be automatically performed at the same time when a standup operation is performed.

To this end, the standup associated back-folding unit includes a standup operation input mechanism 210 connected to a standup operation lever 202 in association with the standup operation lever 202 to unlock the hook 110 from a striker, a standup operation output mechanism 220 connected to the lower frame 100 of the seat cushion to vertically erect the seat cushion while the hook 110 is unlocked and erect the seatback while proceeding the seatback forwards at the same time, a back-folding mechanism 230 connected between the lower frame 110 of the seat cushion and the recliner 130 of the seatback and the recliner of the headrest to operate the recliner 130 of the seatback during a standup operation such that a forward folding operation of the seatback and a forward folding operation of the headrest are performed at the same time.

First, a configuration of the standup operation input mechanism will be described below with reference to FIG. 3, FIG. 4, FIG. 5, and FIG. 6.

The standup operation input mechanism 210 functions to unlock the seat cushion locked and fixed to the floor panel by the medium of the striker and the hook for a standup operation.

In a configuration of the standup operation input mechanism 210, the standup operation lever 202 is mounted to a cover on a side surface of the seat and a first input link 211 is rotatably connected to an outer surface of the side frame 120 of the seatback coaxially connected to the standup operation lever 202 and located inside the cover.

A circular second input link 210 connected to the first input link 211 by a first cable 217 is rotatably connected to a lower portion of the first input link 211 of the side frame 120.

Then, an upper end of the first cable 217 is fixed to an end opposite to a rotation center point of the first input link, and a lower end thereof is fixed to a fixing hole formed on a bottom opposite to a rotation center point of the second input link 212.

A third input link 213 connected to the second input link 212 in association with the second input link 212 is hinge-mounted to an inner surface of the side frame 120, and the third input link 213 is rotated at the same angle when the second input link 212 is angularly rotated while the side frame 120 is interposed between the second input link 212 and the third input link 213.

Figure 5:
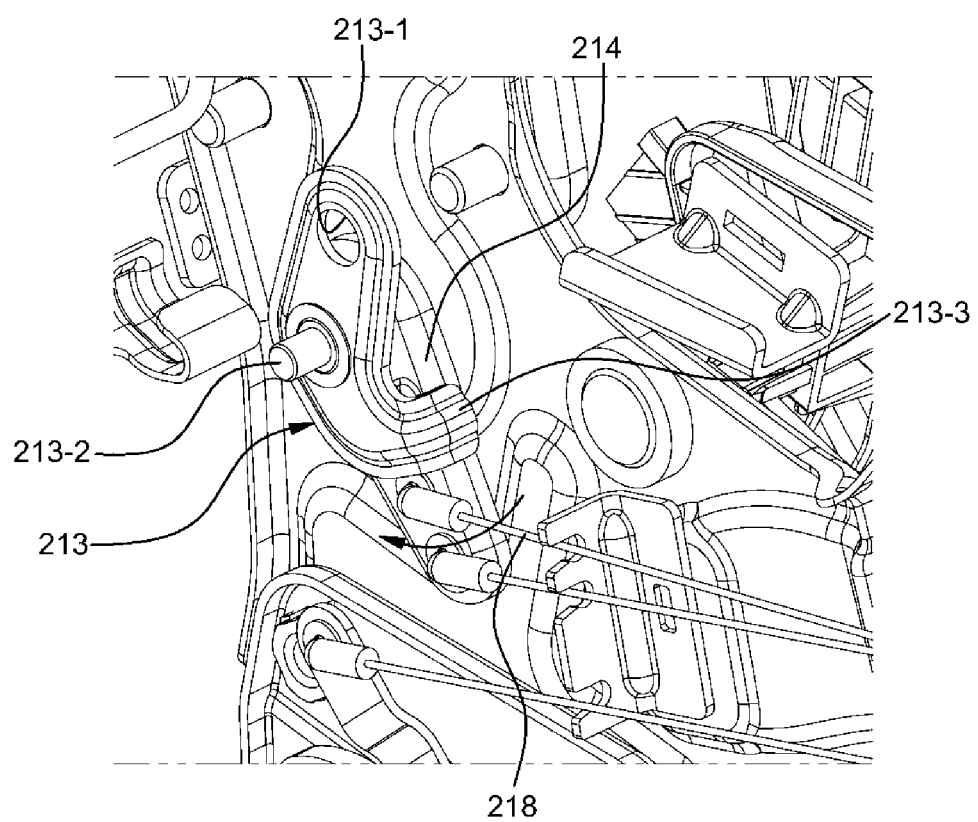

In more detail, as can be seen in FIG. 5, a connection member 213-1 coaxially connected to the second input link 211 is formed at an upper end of the third input link 213, a hinge pin 213-2 hinge-mounted to an inner surface of the side frame 120 is mounted to a central portion of the third input link 213, and a push end 213-3 for angularly rotating a fourth input link 214 is vertically bent inwards and formed integrally with a lower end of the third input link 213.

Then, an upper end of the fourth input link 214 is coaxially connected to the third input link 213, and one end of a second cable 218 is connected to a lower end of the fourth input link 214 to be pushed.

Figure 6:
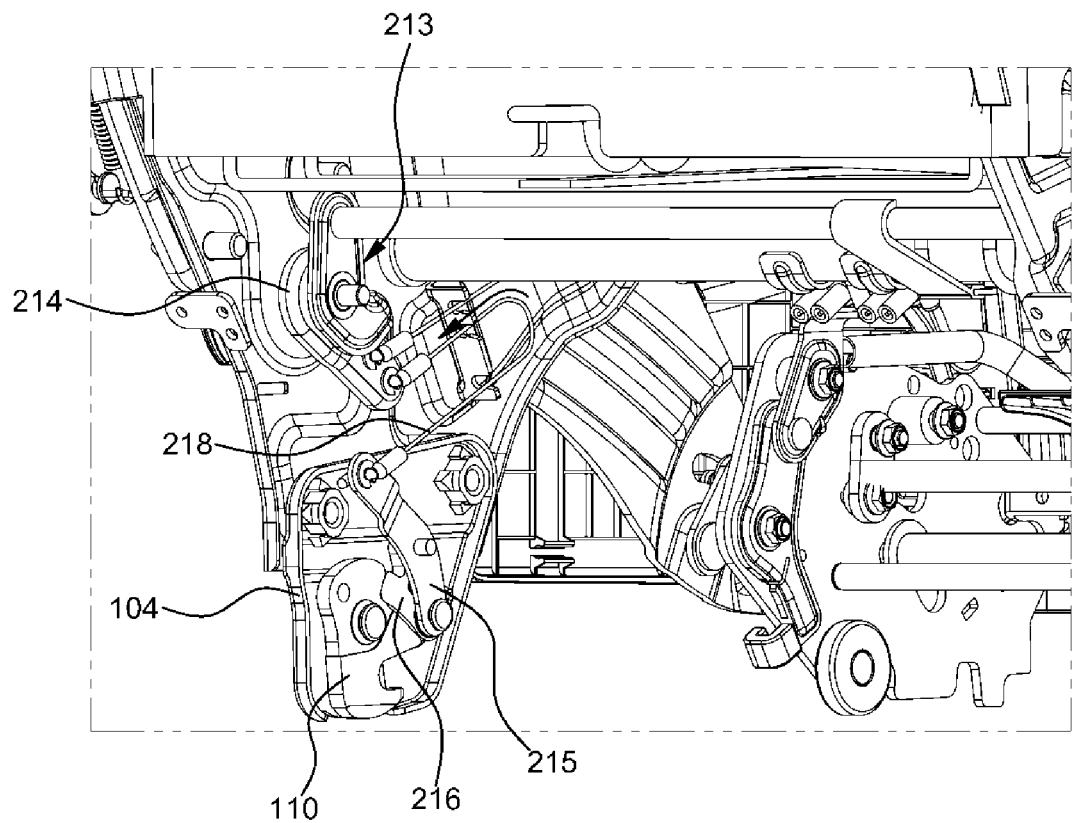

As can be seen in FIG. 6, a lower end of the fifth input link 215 is hinge-coupled to a hook support plate 104 mounted to a lower end of the lower frame 100 of the seat cushion, and an opposite end of the second cable 218 is connected to an upper end of a fifth input link 215.

A cam 216 for rotating the hook 110 to an unlock position while being rotated at the same angle as that of the fifth input link 215 when the second cable 218 is pulled is mounted between the hook support plate 104 and a central portion of the fifth input link 215.

Meanwhile, the hook 110 has a concave locking recess into which the striker (not shown) mounted to the floor panel such that the locking recess into which the striker is inserted is normally located at a position discordant from that of the striker so that the hook 110 is locked to the striker and the locking recess into which the striker is inserted is located at a position coinciding with that of the striker during an unlocking operation so that the hook 110 is in a unlocking state in which the hook 110 is separated from the striker.

First, an operational flow of the above-configured standup operation input mechanism will be described below with reference to FIG. 3, FIG. 4, FIG. 5, and FIG. 6.

First, if the passenger for getting on or off a three-row seat rotates the standup operation lever 202 in one direction, the first input link 211 coaxially connected to the standup operation lever 202 is angularly rotated at the same angle to pull the first cable 217.

Subsequently, the second input link 212 below the first cable 217 is angularly rotated while the first cable 217 is pulled, and the third input link 213 connected to the second input link 212 on an inner surface of the side frame 120 is angularly rotated about the hinge pin 213-2.

That is, because the rotation center shaft of the second input link 210 is connected to the connection member 213-1 formed at an upper end of the third input link 213, an upper end of the third input link 213 is angularly rotated about the hinge pin 213-2 when the second input link 212 is angularly rotated.

Then, when the third input link 213 is angularly rotated, the push end 213-3 bent at a lower end of the third input link 213 angularly rotates the fourth input link 214 while bending the fourth input link 214 back.

In more detail, a lower end of the fourth input link 214 is bent back about a hinge point at an upper end of the fourth input link 214 while being angularly rotated by a force applied by the push end 213-3 of the third input link 213 while the push end 213-3 of the third input link 213 is angularly rotated.

At the same time, the second cable 218 connected to a lower end of the fourth input link 214 is pulled.

As the second cable 218 is pulled, an upper end of the fifth input link 215 to which a lower end of the hook support plate 104 is hinge-mounted is angularly rotated toward a pulling direction (front side) of the second cable 218.

The cam 216 mounted between the hook support plate 104 and a central portion of the fifth input link 215 rotates the hook 110 to an unlocking position while being moved at the same angle as that of the fifth input link 215.

In more detail, in a state in which the cam 216 and the hook 110 contact each other to be locked with each other, because the locking and contacting state of the hook 110 and the cam 216 is released as the cam 216 is rotated, the locking recess of the hook 110 into which the striker is inserted is located at a position coinciding with that of the striker by a restoring force of the return spring (not shown) mounted to a rotary shaft of the hook 110 such that the hook 110 is brought into an unlocked state in which the hook 110 is separated from the striker.

Accordingly, because the hook 110 is brought into an unlocked state in which the hook 110 is separated from the striker, a standup operation of angularly rotating the seat cushion forwards and vertically erecting the seat cushion is performed.

The standup operation of the seat cushion is substantially performed by the standup operation output mechanism 220.

Figure 7:
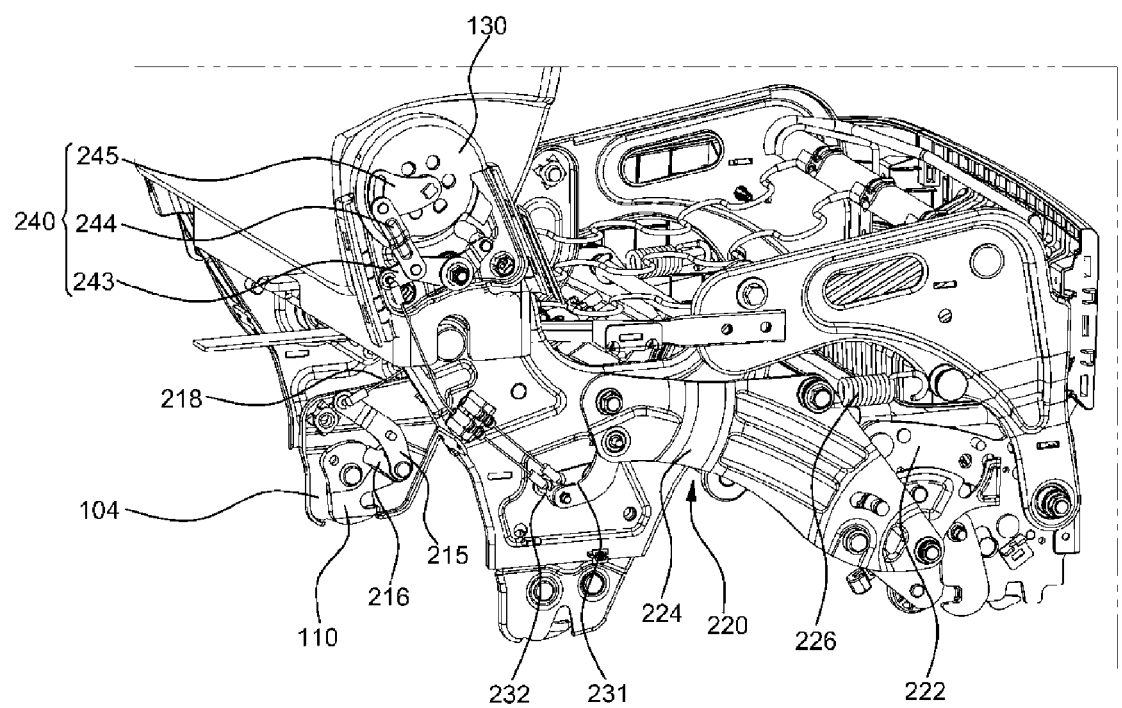
FIG. 7 and FIG. 8 are perspective views showing a standup operation output mechanism and an operational structure of the apparatus for back-folding a standup seat of a vehicle according to an exemplary embodiment of the present invention.
Figure 8:
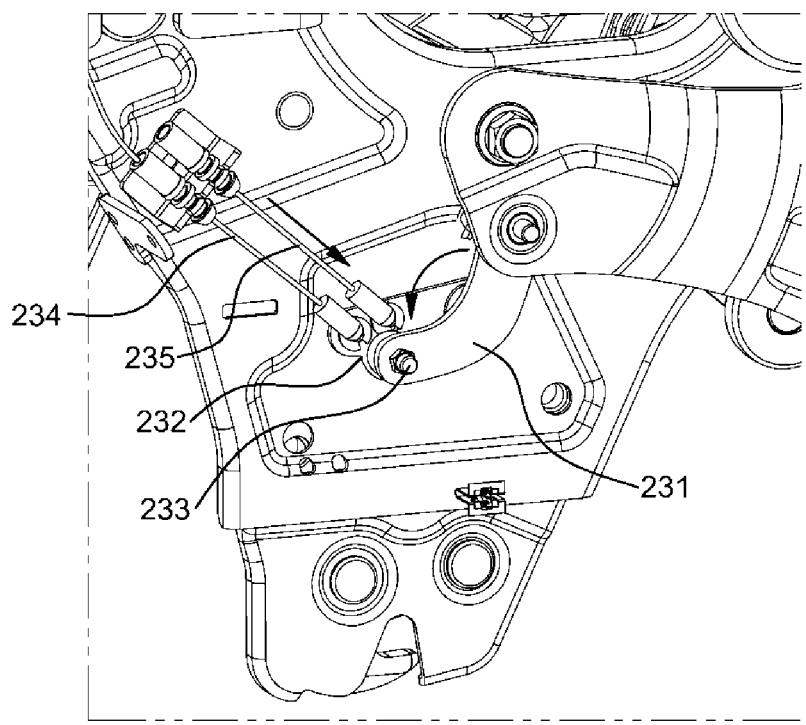

Here, a configuration and an operational flow of the standup operation output mechanism will be described with reference to FIG. 7 and FIG. 8.

The standup operation output mechanism 220 is a part for substantially performing a standup operation of the seat cushion and the seatback, and functions to vertically erect the seat cushion while angularly rotating the seat cushion forwards and vertically arranging the seatback after moving the seatback forwards.

To this end, the lower frame 110 and the front frame 222 of the seat cushion are hinge-connected to each other by a connection frame 224.

That is, a rear end of the connection frame 224 is hinge-connected to the lower frame 110, and a front end of the connection frame 224 is hinge-connected to the front frame 222 of the seat cushion fixed to the floor panel.

A resilient pulling mechanism 226 for pulling the connection frame 224 by a resilient restoring force to unlock the hook 110 and perform a standup operation is connected between the connection frame 224 and the front frame 222.

Accordingly, if the hook 110 is in an unlocked state in which the hook 110 is separated from the striker, the connection frame 224 is pulled forwards by a resilient restoring force of the resilient pulling mechanism and the connection frame 224 is angularly rotated forwards about a hinge fixing point of the front frame 222 and then the lower frame 110 connected to a rear end of the connection frame 224 is angularly rotated forwards while being dragged by the connection frame 224.

Accordingly, because the lower frame 110 forming a frame of the seat cushion and the connection frame 224 are angularly rotated to be erected forwards, a standup operation of vertically erecting the seat cushion and moving the seatback connected to the seat cushion forwards to vertically erect the seatback is performed.

Here, a configuration of the back-folding mechanism will be described with reference to FIG. 9, FIG. 10 and FIG. 11.

The back-folding mechanism 230 functions to operating the recliner of the seatback to automatically perform a forward folding operation of the seatback during a standup operation.

To this end, a first back-folding link 231 of which a front end is hinge-connected to a rear end of the connection frame 224 of the standup operation output mechanism 220 and of which a central portion is hinge-coupled to the lower frame 110 is provided.

A second back-folding link 232 is connected between the first back-folding link 231 and the lower frame 110.

In more detail, a front end of the second back-folding link 232 is coaxially connected to the hinge coupling part of the first back-folding link 231, a lower portion of the rear end of the second back-folding link 232 is connected to a rear end of the first back-folding link 231 by a hinge pin 232, and a third cable 234 for a seatback folding operation and a fourth cable 235 for a headrest folding operation are connected to an upper portion of the rear end of the second back-folding link 232 to be pulled.

A third back-folding link 243 of the recliner operation link 240 which unlocks the recliner 130 and allows a forward folding operation of the seatback is connected to an upper end of the third cable 234.

Then, an upper end of the third cable 234 is connected to a rear end of the third back-folding link 243, and a central portion of the third back-folding link 243 is hinge-connected to the side frame 120 of the seatback.

A recliner unlocking link 245 for angularly rotating the recliner 130 to an unlocking position is connected to an unlocking shaft of the recliner 130.

A fourth back-folding link 244 is connected to between the recliner unlocking link 245 and the third back-folding link 243.

In more detail, a lower end of the fourth back-folding link 244 is connected between a rear end and a central portion of the third back-folding link 243, and an upper end of the fourth back-folding link 244 is hinge-connected to the recliner unlocking link 243.

Then, a rotation angle restriction guide pin 246 is mounted to a front end of the third back-folding link 243, and a slot 247 into which the guide pin 246 is inserted to restrict a rotation angle of the third back-folding link 243 passes through the side frame 120 of the seatback.

Here, an operational flow of the above-configured back-folding mechanism will be described with reference to FIG. 9, FIG. 10 and FIG. 11.

As described above, if the hook 110 is in an unlocked state in which the hook 110 is separated from the striker, the lower frame 110 forming a frame of the seat cushion and the connection frame 224 are angularly rotated to be erected forwards by a resilient restoring force of the resilient pulling mechanism 226, so that a standup operation of vertically erecting the seat cushion and moving the seatback connected to the seat cushion forwards to vertically erect the seatback is performed.

Figure 9:
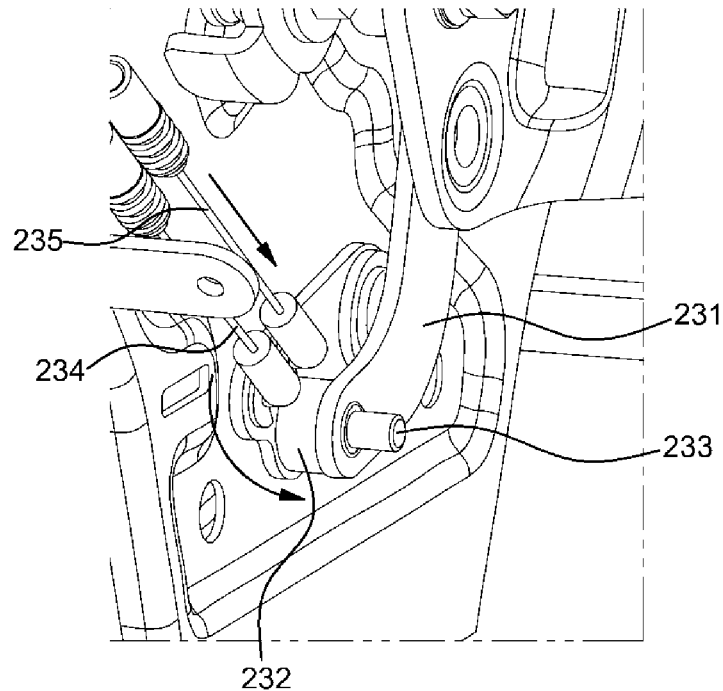
FIG. 9, FIG. 10 and FIG. 11 are perspective views showing a folding back mechanism and an operational structure of the apparatus for back-folding a standup seat of a vehicle according to an exemplary embodiment of the present invention.
Figure 10:
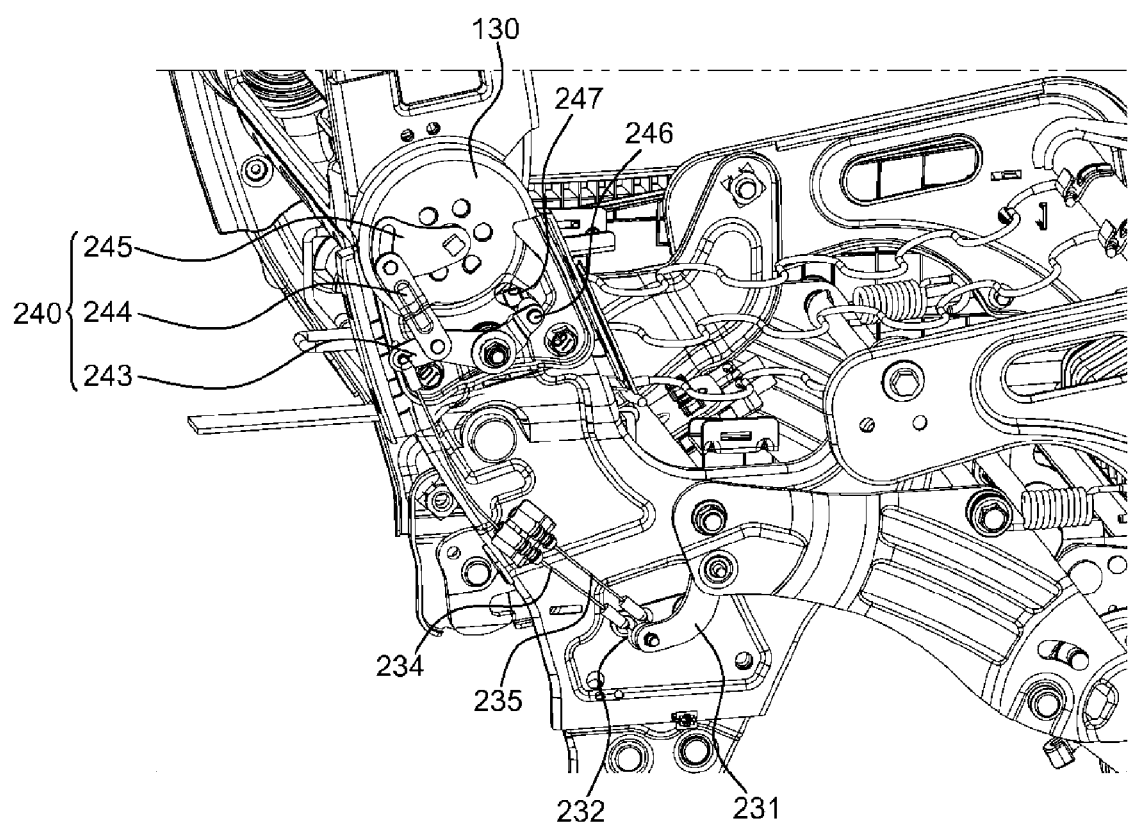
Figure 11:
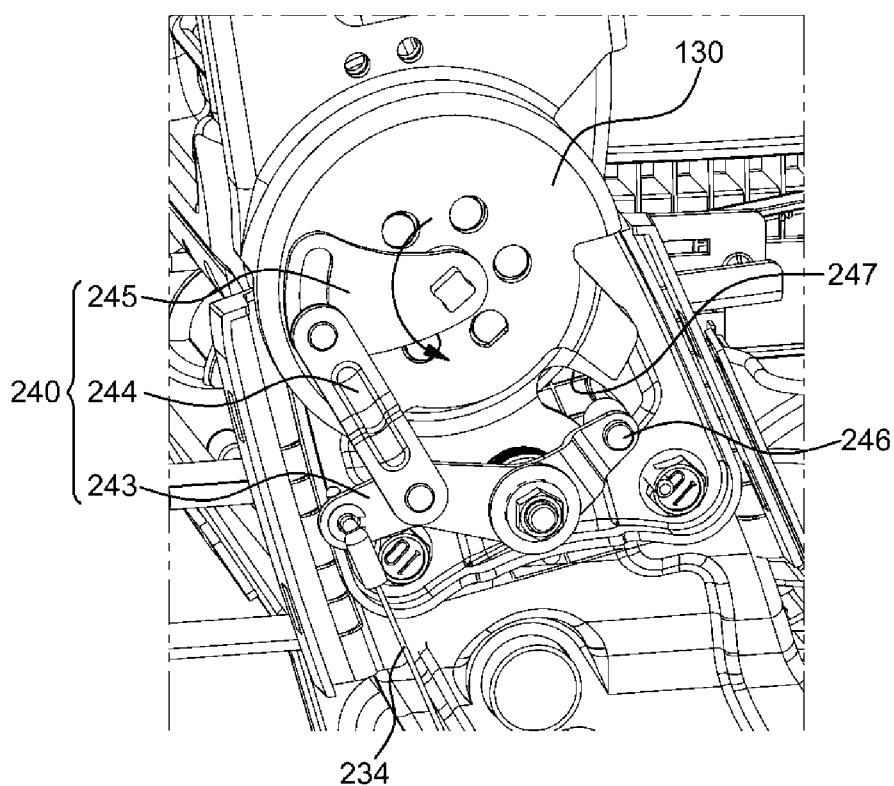

Then, due to a displacement difference between a forward rotation angle of the lower frame 110 of the seat cushion and a forward rotation angle of the connection frame 224, a front end of the first back-folding link 231 (a part hinge-connected to the connection frame) is angularly rotated rearwards about the center thereof and a rear end of the first back-folding link 231 is angularly rotated forwards at the same time as shown in FIG. 9 and FIG. 10.

Subsequently, a rear end of the second back-folding link 232 connected to a rear end of the first back-folding link 231 by a hinge pin 232 is also angularly rotated forwards at the same angle.

Accordingly, as the rear end of the second back-folding link 232 is angularly rotated forwards, the third cable 234 for a seatback folding operation and the fourth cable 235 for a headrest folding operation are pulled downwards.

As the third cable 234 is pulled downwards, one end of the third back-folding link 243 of the recliner operation link 240 connected to an upper end of the third cable 234 is pulled downwards and the guide pin 246 of an opposite end thereof is moved while an angle of the guide pin 246 is restricted along the slot 247 formed in the side frame 120.

At the same time, when one end of the third back-folding link 243 is pulled downwards, the fourth back-folding link 244 is pulled downwards and the fourth back-folding link 244 angularly rotates the recliner unlocking link 245 connected to an unlocking shaft of the recliner 130.

Because the recliner unlocking link 245 is angularly rotated such that the unlocking shaft of the recliner 130 is rotated in an unlocking direction, the recliner 130 is operated and a forward folding operation of the seatback is performed according to an operation of the recliner 130.

Meanwhile, as the fourth cable 235 is pulled, the locked state of the rotary shaft for a forward folding operation of the headrest is released such that the rotary shaft is rotated forwards by a resilient restoring force of the spring (not shown) and the headrest is folded forwards at the same time.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for back-folding a standup seat of a vehicle,
    wherein a standup associated back-folding unit is installed between a hook mounted to a lower frame of a seat cushion to be locked to or unlocked from a striker of a floor panel, and a recliner mounted to a side frame of a seatback such that a forward folding operation of the seatback and a forward folding operation of a headrest is automatically performed by operating the recliner during a standup operation,
    wherein a standup operation input mechanism comprises:
        a first input link coaxially connected to a standup operation lever and mounted to an outer surface of the side frame of the seatback;
        a second input link disposed below the first input link and rotatably connected to the first input link by a first cable;
        a third input link hinge-mounted to an inner surface of the side frame while being connected to the second input link in association with the second input link to be rotated at a same angle while the second input link is angularly rotated;
        a fourth input link having an upper end coaxially connected to the third input link, and in which one end of a second cable is connected to a lower end of the fourth input link;
        a fifth input link to which a lower end of a hook support plate mounted to a lower end of the lower frame of the seat cushion is hinge-mounted and in which an opposite end of the second cable is connected to an upper end of the fifth input link at a same time; and
        a cam connected to a central portion of the fifth input link, for rotating the hook to an unlock position while being rotated at a same angle as that of the fifth input link when the second cable is pulled.

2. The apparatus of claim 1, wherein the standup associated back-folding unit comprises:
    the standup operation input mechanism connected to the standup operation lever in association with the standup operation lever to unlock the hook from the striker;
    a standup operation output mechanism connected to the lower frame of the seat cushion to vertically erect the seat cushion while the hook is unlocked and erect the seatback while proceeding the seatback forwards at a same time; and
    a back-folding mechanism connected between the lower frame of the seat cushion and the recliner of the seatback and the recliner of the headrest to operate the recliner of the seatback during the standup operation such that the forward folding operation of the seatback and the forward folding operation of the headrest are performed at a same time.

3. The apparatus of claim 2, wherein the standup operation output mechanism comprises:
    a connection frame of which a rear end is hinge-connected to the lower frame of the seat cushion and of which a front end is hinge-connected to a front frame of the seat cushion fixed to a floor panel; and
    a resilient pulling mechanism connected between the connection frame and the front frame, for pulling the connection frame by a resilient restoring force to unlock the hook and perform the standup operation.

4. The apparatus of claim 1, wherein a connection member coaxially connected to the second input link is formed at an upper end of the third input link, a hinge pin hinge-mounted to an inner surface of the side frame is mounted to a central portion of the third input link, and a push end for angularly rotating the fourth input link is bent at a lower end of the third input link.

5. The apparatus of claim 1, wherein the back-folding mechanism comprises:
    a first back-folding link of which a front end is hinge-connected to a rear end of the connection frame of the standup operation output mechanism and of which a central portion is hinge-coupled to the lower frame;
    a second back-folding link in which a front end of the second back-folding link is coaxially connected to the hinge coupling part of the first back-folding link, a lower portion of the rear end of the second back-folding link is connected to a rear end of the first back-folding link by a hinge pin, and a third cable for a seatback folding operation and a fourth cable for a headrest folding operation are connected to an upper portion of the rear end of the second back-folding link to be pulled;
    a recliner operation link connected to an upper end of the third cable, for unlocking the recliner and allowing the forward folding operation of the seatback; and
    a headrest operation link connected to an upper end of the fourth cable, for unlocking a heat rest rotation link and allowing the forward folding operation of the headrest.

6. The apparatus of claim 5, wherein the recliner operation link comprises:

a third back-folding link in which an upper end of the third cable is connected to a rear end of the third back-folding link and of which a central portion is hinge-coupled to a side frame of the seatback;

a recliner unlocking link connected to an unlocking shaft of the recliner, for angularly rotating the recliner to an unlocking position; and a fourth back-folding link of which a lower end is connected between a rear end and a central portion of the third back-folding link and of which an upper end is hinge-connected to the recliner unlocking link.

7. The apparatus of claim 6, wherein a rotation angle restriction guide pin is mounted to a front end of the third back-folding link, and a slot into which the guide pin is inserted passes through the side frame of the seatback.

* * * * *